United States Patent
Rezk et al.

(10) Patent No.: US 9,250,314 B2
(45) Date of Patent: Feb. 2, 2016

(54) ENHANCED RADAR DETECTION FOR COMMUNICATION NETWORKS

(71) Applicant: QUALCOMM Incorporated, San Diego, CA (US)

(72) Inventors: Meriam Khufu Ragheb Rezk, Campbell, CA (US); Mahboobul Alem, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 241 days.

(21) Appl. No.: 13/943,180

(22) Filed: Jul. 16, 2013

(65) Prior Publication Data
US 2014/0254346 A1    Sep. 11, 2014

Related U.S. Application Data

(60) Provisional application No. 61/775,311, filed on Mar. 8, 2013.

(51) Int. Cl.
*G01S 7/02* (2006.01)
*H04K 3/00* (2006.01)

(52) U.S. Cl.
CPC .............. *G01S 7/021* (2013.01); *H04K 3/226* (2013.01); *H04K 3/822* (2013.01); *H04K 2203/18* (2013.01)

(58) Field of Classification Search
CPC ........ G01S 7/021; H04K 3/226; H04K 3/822; H04K 2203/18
See application file for complete search history.

(56) References Cited

U.S. PATENT DOCUMENTS

| | | | |
|---|---|---|---|
| 6,191,727 B1 * | 2/2001 | Springer et al. | 342/195 |
| 6,697,013 B2 | 2/2004 | McFarland et al. | |
| 7,397,415 B1 * | 7/2008 | Wang et al. | 342/13 |
| 7,606,335 B2 * | 10/2009 | Kloper et al. | 375/340 |
| 7,848,219 B1 | 12/2010 | Zhang et al. | |
| 8,311,555 B2 | 11/2012 | Kruys et al. | |
| 2003/0107512 A1 * | 6/2003 | McFarland et al. | 342/159 |
| 2007/0126622 A1 * | 6/2007 | Nallapureddy et al. | 342/92 |
| 2007/0281638 A1 * | 12/2007 | Hansen | 455/127.4 |
| 2009/0154589 A1 * | 6/2009 | Monnerie | 375/269 |
| 2010/0202359 A1 | 8/2010 | Nallapureddy et al. | |
| 2012/0229329 A1 | 9/2012 | Steer et al. | |
| 2013/0170586 A1 | 7/2013 | Yucek et al. | |

FOREIGN PATENT DOCUMENTS

EP    1515488 A1    3/2005

* cited by examiner

*Primary Examiner* — Jung Park
*Assistant Examiner* — Chuong M Nguyen
(74) *Attorney, Agent, or Firm* — DeLizio Law, PLLC

(57) ABSTRACT

Radar signals can be detected by a Wireless Local Area Network (WLAN) receiver by modifying one or more pattern matching attributes. In one embodiment, the pattern matching attributes are modified when signal pulses received by the WLAN receiver are determined to have an increased likelihood of being radar signals. In one embodiment, a frequency variance of received signal pulses is used to determine the likelihood of received signal pulses being radar signals. The frequency variance is based, at least in part, on frequencies of Fast Fourier Transforms of the received signal pulses.

33 Claims, 5 Drawing Sheets

ENHANCED RADAR DETECTION FOR COMMUNICATION NETWORKS

CROSS-REFERENCE TO RELATED APPLICATIONS

This application claims the priority benefit of U.S. Provisional Application Ser. No. 61/775,311 filed Mar. 8, 2013.

BACKGROUND

Embodiments of the inventive subject matter generally relate to the field of communication systems and, more particularly, to radar detection in a wireless communication system.

Some Wireless Local Area Network (WLAN) transceivers share an operating spectrum with radar devices in the 5 GHz frequency band. The WLAN transceivers are typically designed to detect radar signals within the frequency bands of operation and, if any radar signals are detected, then the WLAN transceivers vacate operations in that particular band. Detecting radar signals can be difficult, particularly when wireless traffic is being transmitted in a currently selected frequency band.

SUMMARY

Various embodiments are disclosed of a wireless receiver including a radar detection module. In some embodiments, the radar detection module can receive a first and a second signal pulse, measure a signal pulse attribute for each of the first and second signal pulses, determine a Fast Fourier Transform (FFT) representation of the first and second signal pulses, and determine a frequency variance of the FFT representations of the first and second signal pulses. The radar detection module can modify a radar signal matching attribute based, at least in part, on the frequency variance. A radar signal is detected when the first signal pulse attribute and the second signal pulse attribute match radar signal matching attributes of the radar signal, where the radar signal matching attributes include the modified radar signal matching attribute.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
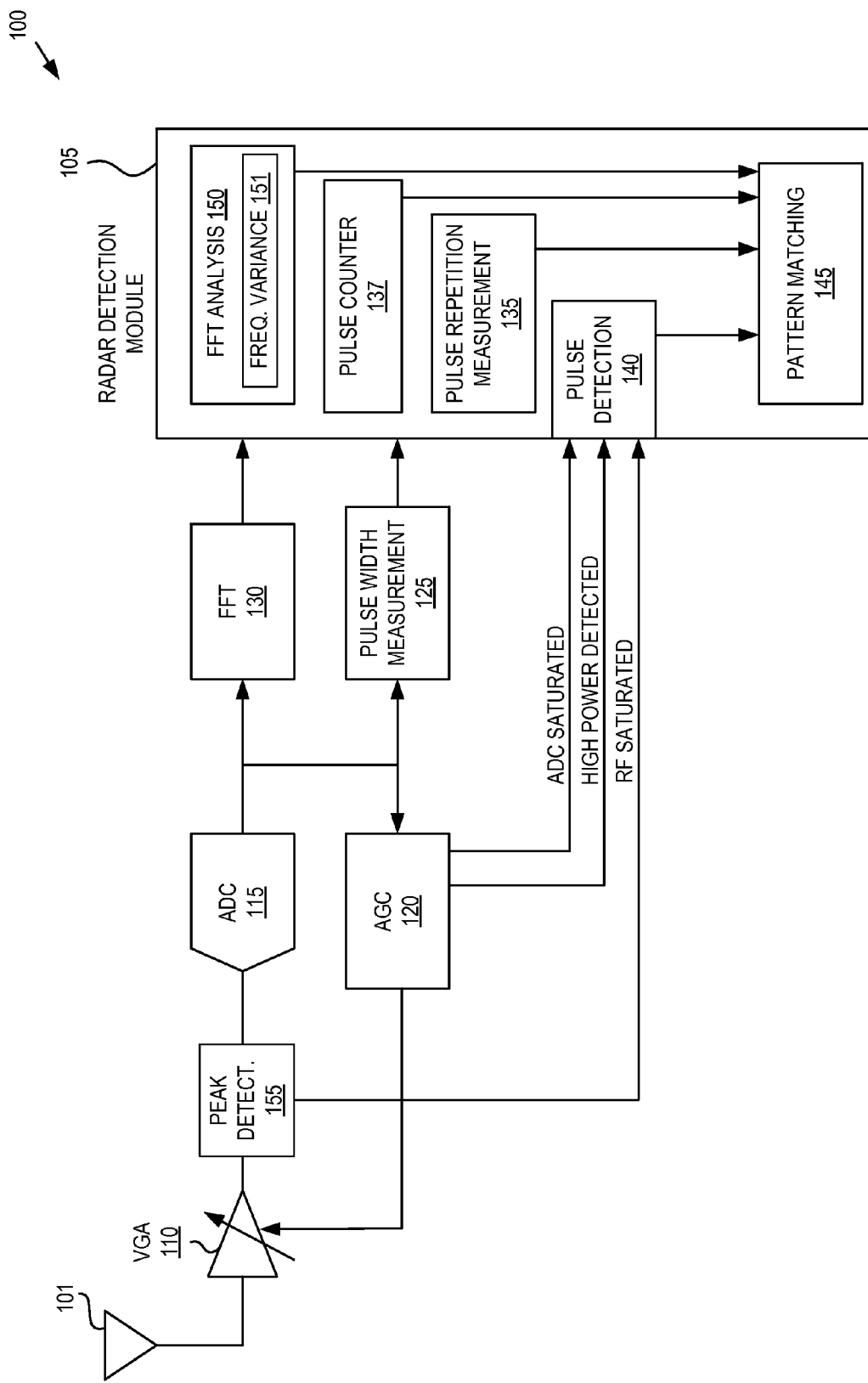
FIG. 1 is a simplified block diagram of one embodiment of a wireless receiver illustrating a radar detection module.

The description that follows includes exemplary systems, methods, techniques, instruction sequences and computer program products that embody techniques of the present inventive subject matter. However, it is understood that the described embodiments may be practiced without these specific details. For instance, although examples refer wireless receivers, the described embodiments can be applied to wireless transceivers as well. In other instances, well-known instruction instances, protocols, structures and techniques have not been shown in detail in order not to obfuscate the description.

Wireless devices, such as Wireless Local Area Network (WLAN) transceivers share an operating spectrum with radar devices in the 5 GHz frequency band. The WLAN transceivers are designed to detect radar signals and vacate operations in a frequency band when radar signals are detected within the frequency band. Radar signals can include particular signal pulse attributes that can be used to identify radar signals. For example, radar signals can be identified by matching received signal pulse attributes with known radar signal matching attributes. Examples of signal pulse attributes can include signal pulse width, pulses per burst, and signal pulse repetition interval.

As a WLAN transceiver carries more traffic, detecting the radar signals can become more difficult. For example, it may be more difficult for a WLAN transceiver, or more particularly a WLAN receiver included in a WLAN transceiver, to detect and identify radar pulses while receiving WLAN signals at the same time. As a result, the WLAN receiver may miss one or more radar pulses within a stream of pulses, thereby failing to detect a radar signal.

One embodiment of an enhanced radar detection module within a WLAN receiver can include a Fast Fourier Transform analysis module configured to track a frequency variance of the received signal pulses. The frequency variance describes a change in the frequency of received signal pulses. A smaller frequency variance can indicate that there is an increased likelihood that the received signal pulses are part of a radar signal. If a number of received signal pulses have less than a predetermined amount of frequency variance, then attributes of the received signal pulses can be compared with (matched with) modified attributes of known radar signals (referred to as radar signal matching attributes) to determine if a radar signal has been received, as will be further described below. The modified radar signal matching attributes can allow received signal pulses to be more easily identified as radar signals. For example, a pulse repetition interval multiplier can be used to modify a known radar signal matching attribute by extending a radar signal pulse interval (typically by an integer multiplier) to accommodate one or more missing received signal pulses. In another embodiment, a signal pulse attribute can be a number of received signal pulses needed to identify a radar signal. The number of received signal pulses can be reduced when the frequency variance is less than a predetermined amount, in order to help identify radar signals. The enhanced radar detection techniques will be further described below with reference to FIGS. 1-5.

FIG. 1 is a simplified block diagram of one embodiment of a wireless receiver 100 including a radar detection module 105. In one embodiment, wireless receiver 100 can be a WLAN receiver included in a wireless device such as a WLAN transceiver. It is noted that other embodiments of other systems can include the radar detection module 105. One example is a wireless system that includes multiple wireless receivers 100, such as a multiple-input multiple-output (MIMO) wireless system (not shown). In a MIMO wireless system, a single radar detection module 105 can be used in conjunction with multiple wireless receivers 100. In one embodiment of a MIMO wireless system, the radar detection module 105 can be coupled to any one of the multiple wireless receivers 100. Returning to FIG. 1, WLAN signals can be received by antenna 101 and coupled to an input of a variable gain amplifier (VGA) 110. An output of VGA 110 can be coupled to an input of an Analog to Digital Converter (ADC) 115. An output of ADC 115 can be coupled to an Automatic Gain Controller (AGC) 120. AGC 120 can monitor the output of ADC 115 and can increase or decrease a gain setting of VGA 110 to size the input signal of ADC 115. For example, if the output of ADC 115 is saturated, then AGC 120 can reduce the gain setting of VGA 110. On the other hand, if the output of ADC 115 is too small, then AGC 120 can increase the gain setting of VGA 110. In this manner, the signal provided to ADC 115 can be sized to not saturate the ADC 115.

The output of ADC 115 can also be coupled to a pulse width measurement module 125. The pulse width measurement module 125 can determine the pulse width (in the time domain) of signals output from ADC 115. The output of ADC 115 can also be coupled to a Fast Fourier Transform (FFT) module 130. The FFT module 130 can perform an FFT on the data received from ADC 115. An output of the FFT module 130 and an output of the pulse width measurement module 125 can be coupled to a radar detection module 105. An ADC saturated signal and a high power detected signal can be coupled from AGC 120 to a pulse detection module 140 in the radar detection module 105. The operation of the pulse detection module 140 is described in detail below in conjunction with the description of the radar detection module 105. In other embodiments, an ADC saturated signal and a high power detected signal can be provided by other modules within wireless receiver 100. For example, ADC 115 can provide the ADC saturated signal to the radar detection module 105. A radio frequency (RF) saturated signal can be coupled from peak detector 155 to the pulse detection module 140 in the radar detection module 105. An example of an RF saturated signal condition is an incoming RF signal that is large enough to overload or saturate at least a portion of the wireless receiver 100. In other embodiments, the RF saturated signal can be provided by other modules such as ADC 115 or VGA 110.

The radar detection module 105 can include a pulse detection module 140, an FFT analysis module 150, a pulse counter 137, a pulse repetition measurement module 135, and a pattern matching module 145. The pulse detection module 140 can determine when a signal pulse is being received by wireless receiver 100. The pulse detection module 140 can receive the ADC saturated signal, the high power detected signal and the RF saturated signal. In one embodiment, the pulse detection module 140 can determine that a signal pulse is received when the ADC 115 output is saturated, a high power signal is detected, or an RF saturated signal is received as will be further described below.

The FFT analysis module 150 can determine a frequency variance 151 of received signal pulses by tracking the frequency of the FFT output from the FFT module 130. In one embodiment, the frequency variance 151 can be determined by tracking the output of FFT module 130 of each received signal pulse. As each signal pulse is received and the FFT is computed, a running low frequency FFT value and a running high frequency FFT value of the FFT output can be updated. For example, the running low and high frequency FFT values can be the lowest and highest frequency values computed by the FFT module 130 within a predetermined time period. In one embodiment, the frequency variance 151 can be the difference between the lowest (minimum) and highest (maximum) frequency values. In another embodiment, the frequency variance 151 can be determined in FFT module 130.

The pulse counter 137 can count received signal pulses. In one embodiment, functionality of the pulse counter 137 can be included in pulse detection module 140. The pulse repetition measurement module 135 can measure the time between received signal pulses to determine a pulse repetition interval (PRI). In another embodiment, functionality of the pulse repetition measurement module 135 can be included in pulse detection module 140.

The pattern matching module 145 can receive the signal pulse attributes. In one embodiment, the attributes of the received signal can include the frequency variance 151 information from the FFT analysis module 150, the number of signal pulses that have been received from the pulse counter 137, the PRI from the pulse repetition measurement module 135 and the output of the pulse detection module 140. The pattern matching module 145 can attempt to match one or more of the attributes (patterns) of the received signal to similar attributes (patterns) of known radar signals to determine if a radar signal is received, as will be further described below. Matching the attributes of the received signal to attributes of known radar signal can be referred to as pattern matching.

In one embodiment, if the frequency of the received signal pulses deviates by a relatively small amount, then the likelihood that the received signal pulses are radar pulses can be greater than if the frequency of the received signal pulses do not deviate by a relatively small amount. The relatively small amount can be based, at least in part, on frequency variance as will be described below in conjunction with FIG. 3. If the received signal pulses have an increased likelihood of being radar pulses, then the pattern matching module 145 can modify one or more attributes of the known radar signals before attempting to match those attributes to the attributes of the received signals. Modifying one or more attributes of the known radar signals before attempting to match attributes of the received signals is described in more detail below in conjunction with FIG. 3.

Figure 2:
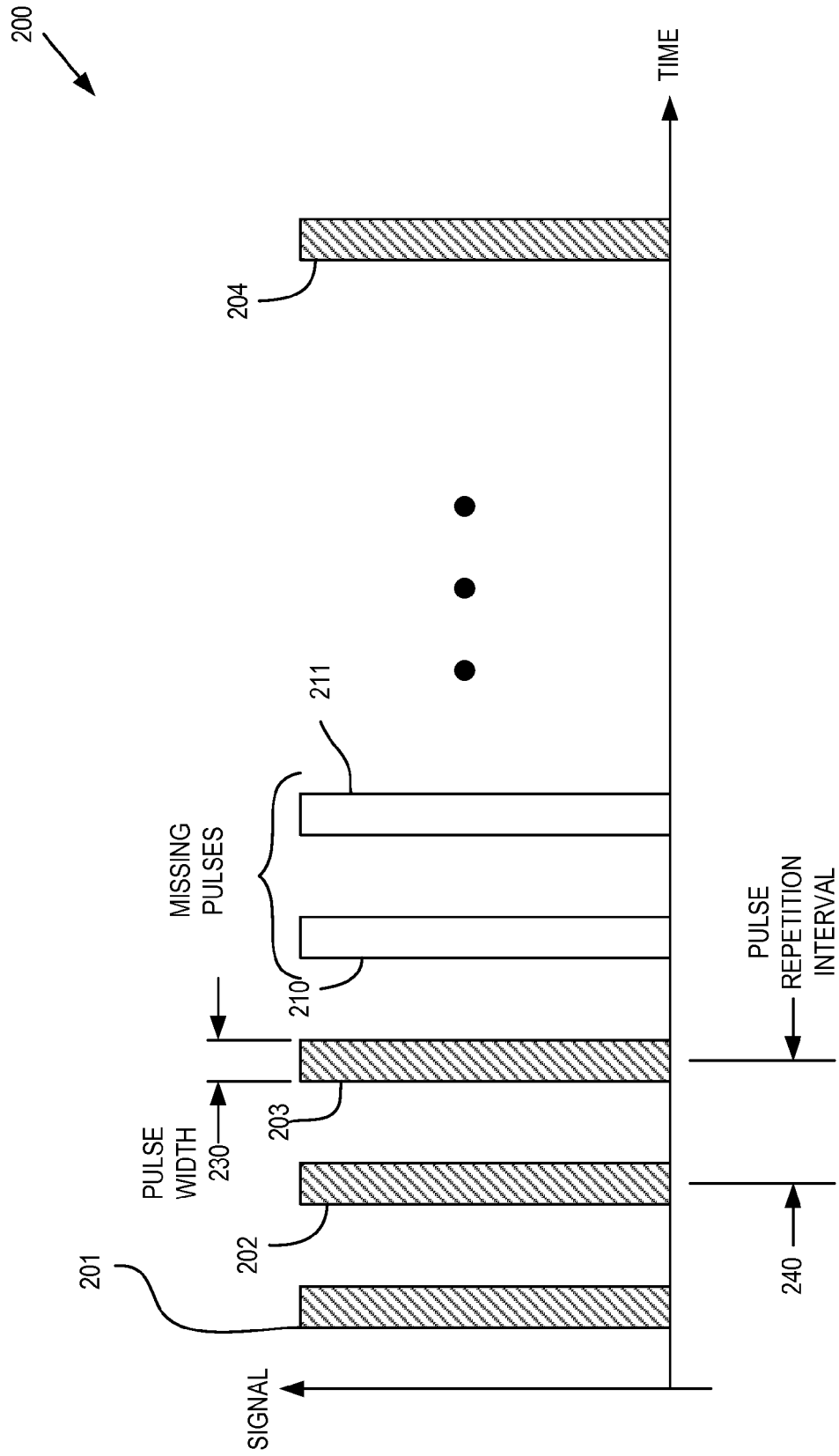
FIG. 2 is an illustration of one embodiment of a radar signal that may be received by a wireless receiver.

FIG. 2 is an illustration of one embodiment of a signal 200 that may be received by wireless receiver 100. Signal 200 may be a radar signal and can include a plurality of pulses 201, 202, 203 and 204. Pulses 201-204 can each have a pulse width 230. A PRI 240 describes an interval of time between pulses. In this example waveform, two pulses 210 and 211 appear to be missing from signal 200.

As described above, radar signals can be identified by matching signal attributes such as pulse width 230, PRI 240 and the number of pulses seen within a time period with similar attributes of known radar signals. In FIG. 2, two pulses 210 and 211 are shown as missing from signal 200. In one embodiment, these pulses can appear to be missing because wireless receiver 100 may have been receiving a WLAN communication signals at the time when pulses 210 and 211 could have been received at antenna 101. Thus, although pulses 210 and 211 may be present in a received signal, pulses 210 and 211 may be missed by wireless receiver 100 and thus not detected. Since pulses 210 and 211 appear to be missing from the received signal 200, pattern matching may fail to identify signal 200 as a radar signal.

With respect to any particular regulatory domain (FCC, JAPAN, ETSI etc.), known radar signals can have a particular pulse width 230, PRI 240 and a number of pulses within a certain time period (i.e., burst period). Although a known radar signal can have a relatively large number of pulses in a burst period, not all pulses need to be received to identify the known radar signal. Thus, in one embodiment, a subset of pulses may be sufficient to identify the known radar signal. One example of a radar identification table is shown below as Table 1. The radar identification table can vary from one regulatory domain to another. As shown in Table 1, known radar signals can be identified by a pulse width 230 and a pulse repetition interval (PRI 240). In one embodiment, a minimum number of signal pulses (shown in Table 1 as minimum pulse count) can describe how many pulses may be needed to identify a particular known radar signal (radar type).

TABLE 1

Radar Identification Table

| Radar type | Pulse Width (μs) | PRI (μs) | Pulse per burst | Chirp bandwidth | PRI Multiplier | Minimum pulse count |
|---|---|---|---|---|---|---|
| 1 | 1 | 1428 | 18 | 0 | 2 | 7 |
| 2 | 1-5 | 150-230 | 23-29 | 0 | 2 | 8 |
| 3 | 6-10 | 200-500 | 16-18 | 0 | 2 | 6 |
| 4 | 11-20 | 200-500 | 12-16 | 0 | 2 | 6 |
| 5 | 50-100 | 1000-2000 | 1-3 | 5-20 MHz | 2 | 8 |

In one embodiment, missing pulses such as pulses 210 and 211 can be accommodated when the signal pulses that are received can be identified as more likely (or more probable) to be part of a radar signal. In one embodiment, the frequency variance of signal pulses can be determined and used to determine the likelihood that the signal pulses are radar pulses. When the signal pulses are likely a part of a radar signal, then the pattern matching module 145 can modify one or more attributes of the known radar signals before attempting to match the attributes of received signal pulses.

In one embodiment, a PRI multiplier can be used to modify an attribute of the known radar signal. Table 1 shows a PRI time for different known radar signal types. As described above, the PRI time is the time between radar pulses. Thus, if a received signal pulse is a part of a known radar signal, the signal pulse will be separated from a next signal pulse by the PRI time. If a signal pulse is missing, however, then the next signal pulse may not be found during the PRI time and, thus, the received signal attributes may not match the attributes of the known radar signals. The PRI multiplier can multiply the PRI time of a known radar signal to accommodate for the missing signal pulse. For example, if the PRI multiplier is two (shown as the default value in Table 1), then the pattern matching module 145 can search for a next signal pulse two PRI time periods after a first signal pulse. In this manner, a PRI multiplier of two can accommodate a missing signal pulse in a received signal. In another embodiment, other PRI multiplier values can be used.

Figure 3:
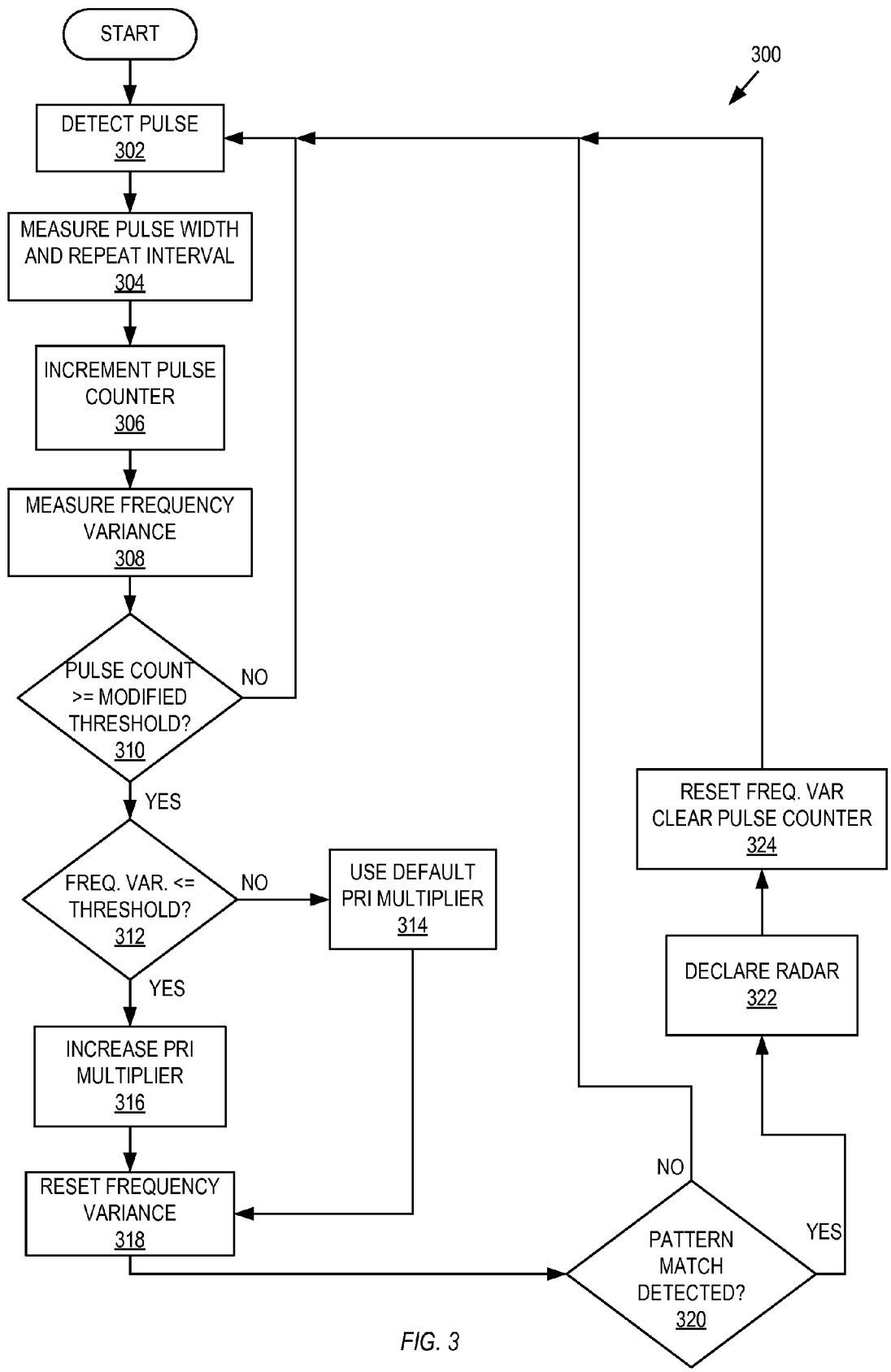
FIG. 3 is a flow diagram illustrating exemplary operations of one embodiment of radar detection in a wireless receiver.

FIG. 3 is a flow diagram 300 illustrating exemplary operations of one embodiment of the radar detection module 105 in a wireless receiver 100. The method of FIG. 3 is described with reference to the wireless receiver 100 of FIG. 1 (for illustration purposes and not as a limitation). The example operations can be carried out by one or more components of the wireless receiver 100, such as a processor (not shown) or other modules within the wireless receiver 100 such as the radar detection module 105.

The method can begin in block 302, where a signal pulse is detected. In one embodiment, a signal pulse is detected when at least one of an ADC saturation event, RF saturated event or high power detected event is detected. In one embodiment, ADC 115 saturation and high power detected events can be detected by AGC 120 and RF saturation events can be detected by peak detector 155. Proceeding to block 304, signal pulse width 230 is measured and PRI 240 is determined. In one embodiment, signal pulse width 230 can be measured with pulse width measurement module 125. PRI 240 can be determined after at least a second signal pulse is received. In one embodiment, PRI 240 can be determined by pulse repetition measurement module 135. Proceeding to block 306, pulse counter 137 can be incremented to determine a count of received signal pulses. Next, proceeding to block 308, the frequency variance 151 of received signal pulses can be determined. As described above, the frequency variance 151 can be determined by tracking the difference between high and low frequencies of the FFT representations of the received signal pulses.

Proceeding to block 310, the signal pulse count (from block 306) is compared to a modified pulse count threshold. In one embodiment, the modified pulse count threshold is a minimum pulse count value associated with all radar types within a regulatory domain. For example, examination of Table 1 shows five radar signal types. Each radar signal type has associated with it a minimum pulse count values (as shown in the last column of the table). The minimum pulse count values, in this example, are 7, 8, 6, 6 and 8. The minimum number of all these pulse count values is 6; therefore, the modified pulse count threshold in this example is 6. These pulse count values are merely exemplary and not meant to be limiting. In one embodiment, pulse count values change with respect to different regulatory domains. The modified pulse count threshold is used to provide a "decision gate" or set of conditions that should be met before modifying known radar signal matching attributes (as will be described below in block 316). In one embodiment, waiting for conditions to meet the modified pulse count threshold can reduce execution time or reduce unnecessary computations or processing. For example, until the modified pulse count threshold is met, there may not be enough signal pulses to match any known radar signal matching attributes. Therefore, checking signal pulse attributes (described below in block 320) before the modified pulse count threshold is met can be unnecessary.

Returning to block 310, if the signal pulse count is less than the modified pulse count threshold, then flow can return to block 302. On the other hand, if the signal pulse count is greater than or equal to the modified pulse count threshold, then in block 312, the frequency variance 151 of the signal pulses is compared to a frequency variance threshold. In one embodiment, a small frequency variance 151 can indicate an increased likelihood that signal pulses are radar signals. For example, the frequency variance 151 can be small when the frequency variance 151 is less than the frequency variance threshold. If the frequency variance 151 is greater than the frequency variance threshold, then a default PRI multiplier (e.g. multiplier value=two, as shown in Table 1) is selected in block 314 and flow proceeds to block 318. On the other hand, if the frequency variance 151 is less than the frequency variance threshold, then in block 316, the PRI multiplier is increased and flow proceeds to block 318. For example, the PRI multiplier can be increased from two (default) to three (new). In one embodiment, the frequency variance threshold can be an amount approximately equivalent to one FFT bin. Persons skilled in the art will recognize that an FFT bin width (frequency) is related to the sampling rate of the digital signal used for the FFT and the number of bins used in the FFT computation. In another embodiment, the frequency variance threshold can be 1.25 MHz. In yet another embodiment, the frequency variance threshold can be a function of the sampling rate of ADC 115. In other embodiments, other known radar signal matching attributes can be modified.

The modification of the PRI multiplier (provided in block 316) can enable radar signals to more easily be detected by relaxing the PRI attribute used to match signal pulse attributes to radar signal matching attributes. As described above, increasing the PRI multiplier (typically by an integer amount) can increase the PRI 240 time period and can accommodate a missing signal pulse, such as pulse 210 or 211. For example, a PRI multiplier of three can increase radar type 1 PRI 240 from 1428 μs to 4284 μs. Thus, instead of expecting to detect a signal pulse one PRI 240 time period from a first signal pulse, the pattern matching module 145 can expect a signal pulse three PRI 240 time periods from the first signal pulse, in effect accommodating additional missing signal pulses.

Proceeding to block 318, frequency variance measurements can be reset. In one implementation, the minimum and maximum frequency values determined in conjunction with block 308 can be cleared. Clearing the minimum and maximum frequency values can prepare the FFT analysis module 150 to collect new data for a new frequency variance 151 determination. Flow can proceed to block 320 where a pattern match can be detected between attributes of signal pulses and known radar signals. If a pattern match is not found, flow returns to block 302. If, on the other hand, a pattern match is found, then in block 322, a radar signal is identified and declared found. In some embodiments, when a radar signal is declared found, WLAN transceivers can vacate the currently operating frequency band and coordinate a frequency move of other WLAN devices.

In one embodiment, the attributes of known radar signals can be described by a table, such as a Radar Identification Table shown in Table 1. In one embodiment, the number of signal pulses used for pattern matching (block 320) can be independent of the modified pulse count threshold (block 310). Returning to our example above, a modified pulse count threshold can be 6, while pattern matching pulse count values can be 7, 8, 6, 6 and 8, as described in Table 1.

Proceeding to block 324, the pulse counter 137 and the minimum and maximum frequency values determined in conjunction with block 308 can be reset. In one embodiment, the pulse counter 137 can be cleared and minimum and maximum frequency values can be reset to prepare the wireless receiver 100 to operate in a new frequency band. Flow can return to block 302.

The method described in FIG. 3 can help identify radar signals when a relatively small (i.e., on the order of two or three) number of pulses are missed. In some operating conditions when channel loading (i.e., high amounts of WLAN communication traffic) can cause even more signal pulses to be missed, a different procedure can be used to identify radar signals which is described below in FIG. 4.

Figure 4:
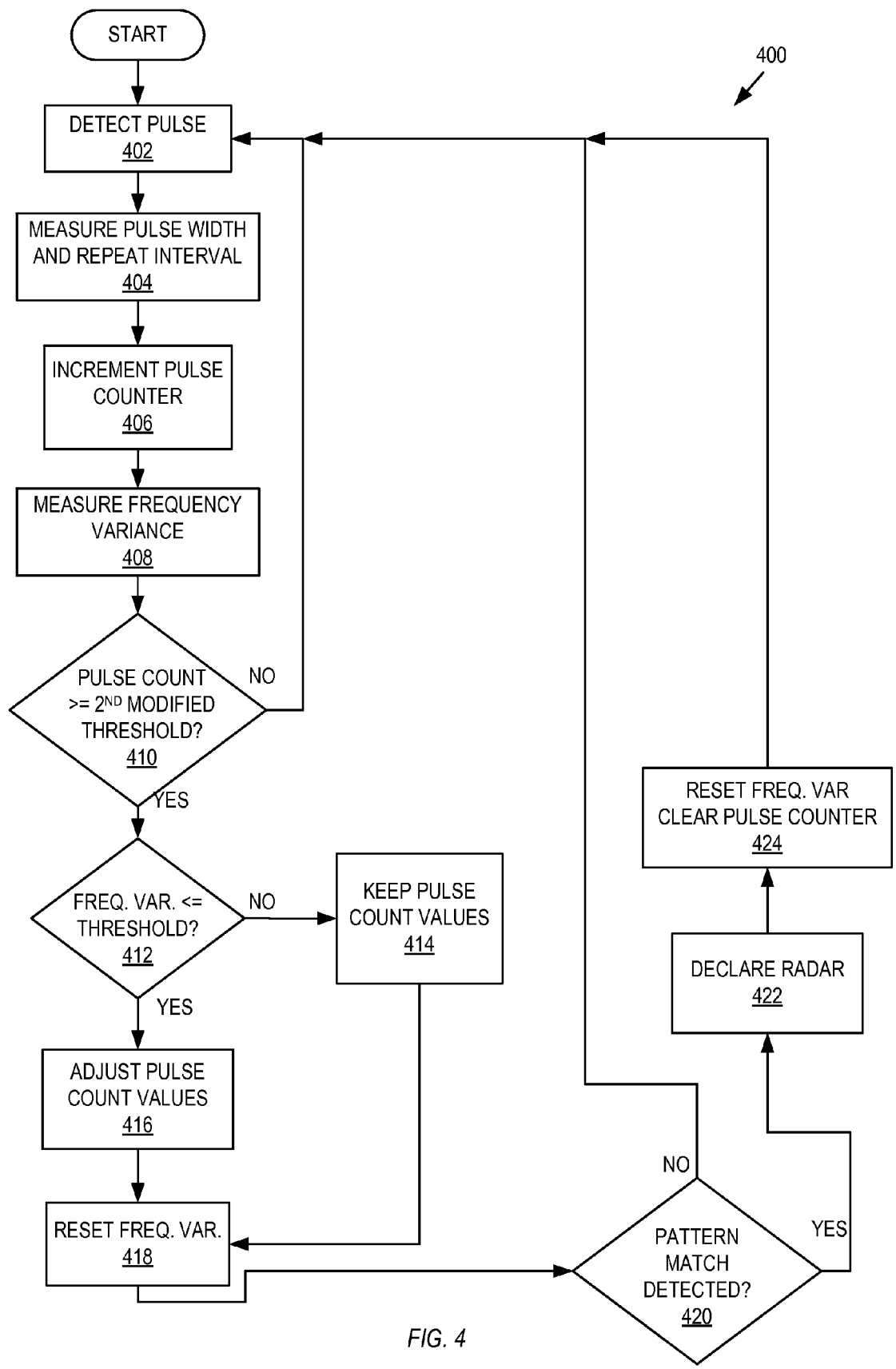
FIG. 4 is a flow diagram illustrating exemplary operations of another embodiment of a radar detection module in a wireless receiver.

FIG. 4 is a flow diagram 400 illustrating exemplary operations of another embodiment of the radar detection module 105 in a wireless receiver 100. The method of FIG. 4 is described with reference to the wireless receiver 100 of FIG. 1 (for illustration purposes and not as a limitation). The example operations can be carried out by one or more components of the wireless reciever 100, such as a processor (not shown) within the wireless receiver 100 or other modules within the wireless receiver 100 such as the radar detection module 105. As described below, the method described in FIG. 4 shares several blocks in common with FIG. 3. In one embodiment, the method of FIG. 4 can accommodate missing signal pulses by reducing the pulse count attribute of known radar signals. The reduction of the pulse count attributes can take place when there is an increased likelihood that the received signal pulses are radar signals.

The method can begin in block 402 where a signal pulse is detected. The flow can proceed to block 404, where signal pulse width 230 is measured and PRI 240 is determined. Proceeding to block 406, the pulse counter 137 can be incremented to count received signal pulses. Proceeding to block 408, the frequency variance 151 of the received signal pulses can be determined. Blocks 402, 404, 406 and 408 can be substantially similar to blocks 302, 304, 306 and 308 as described in FIG. 3.

Proceeding to block 410, the signal pulse count (from block 406) is compared to a second modified pulse count threshold. In one embodiment, the second modified pulse count threshold is a minimum pulse count value associated with all radar types in a regulatory domain minus a predetermined value. For example, examination of Table 1 shows five radar types, with five entries for minimum pulse count values as shown in the last column of the table; in this example, values are 7, 8, 6, 6 and 8. The minimum number of these pulse count values is 6. If the predetermined value is 1, then the second modified pulse count threshold in this example is 5. These pulse count values are merely exemplary and not meant to be limiting. In one embodiment, pulse count values change with respect to different regulatory domains. The second modified pulse count threshold is used to provide a decision gate, similar to the pulse count threshold described above in FIG. 3.

Returning to block 410, if the pulse count is not greater than or equal to the second modified pulse count threshold, then flow returns to block 402. On the other hand, if the pulse count is greater than or equal to the second modified pulse count threshold, then in block 412, if the frequency variance 151 of the signal pulses is less than or equal to a frequency variance threshold, then in block 416 pulse count values (used for pattern matching) for all radar types can be modified. In one embodiment, the pulse count values for all radar types are decreased by one. By decreasing the pulse count values, the requirements to identify radar signals are relaxed since fewer received signal pulses are needed to identify radar signal. For example, each pulse count value in Table 1 (last column) can be decreased by one. Therefore, pulse count values would change from 7, 8, 6, 6, 8 to 6, 7, 5, 5, 7. In other embodiments, each radar type can be decreased by different amounts (i.e., the pulse count values used for pattern matching need not be decreased by a constant amount). The modified pulse count values used for pattern matching cannot be modified to a value less than the second modified pulse count threshold determined in block 410. The modified pulse count values can be used by pattern matching module 145 to detect radar signals as described above. Flow can proceed to block 418.

On the other hand, if the frequency variance 151 of signal pulses is not less than or equal to the frequency variance threshold, then in block 414, pulse count values used for pattern matching are not changed. Proceeding to block 418, frequency variance 151 measurements (minimum and maximum frequencies for FFT representations) can be reset. This block can be substantially similar to block 318 in FIG. 3. Flow can proceed to block 420 where a pattern match can be detected. In one embodiment, the pattern matching can be in accordance with PRI 240 and pulse width 230 values described in Table 1 and a pulse count for pattern matching as determined in block 416 (modified) or block 414 (unmodified). If a pattern match is not found, flow returns to block 402. On the other hand, if a pattern match is found, then in block 422 a radar signal is declared found and in block 424, the pulse counter 137 and the minimum and maximum frequency values determined in conjunction with block 408 can be cleared. Blocks 422 and 424 can be substantially similar to blocks 322 and 324 described in FIG. 3. Flow can return to block 402.

In one embodiment, the method described in FIG. 3 can be independent of the method described in FIG. 4. Therefore, in one embodiment, the method described in FIG. 3 can be performed in parallel to the method described in FIG. 4.

It should be understood that FIGS. 1-4 and the operations described herein are examples meant to aid in understanding embodiments and should not be used to limit embodiments or limit scope of the claims. Embodiments may perform additional operations, fewer operations, operations in a different order, operations in parallel, and some operations differently.

As will be appreciated by one skilled in the art, aspects of the present inventive subject matter may be embodied as a system, method, or computer program product. Accordingly, aspects of the present inventive subject matter may take the form of an entirely hardware embodiment, a software embodiment (including firmware, resident software, microcode, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
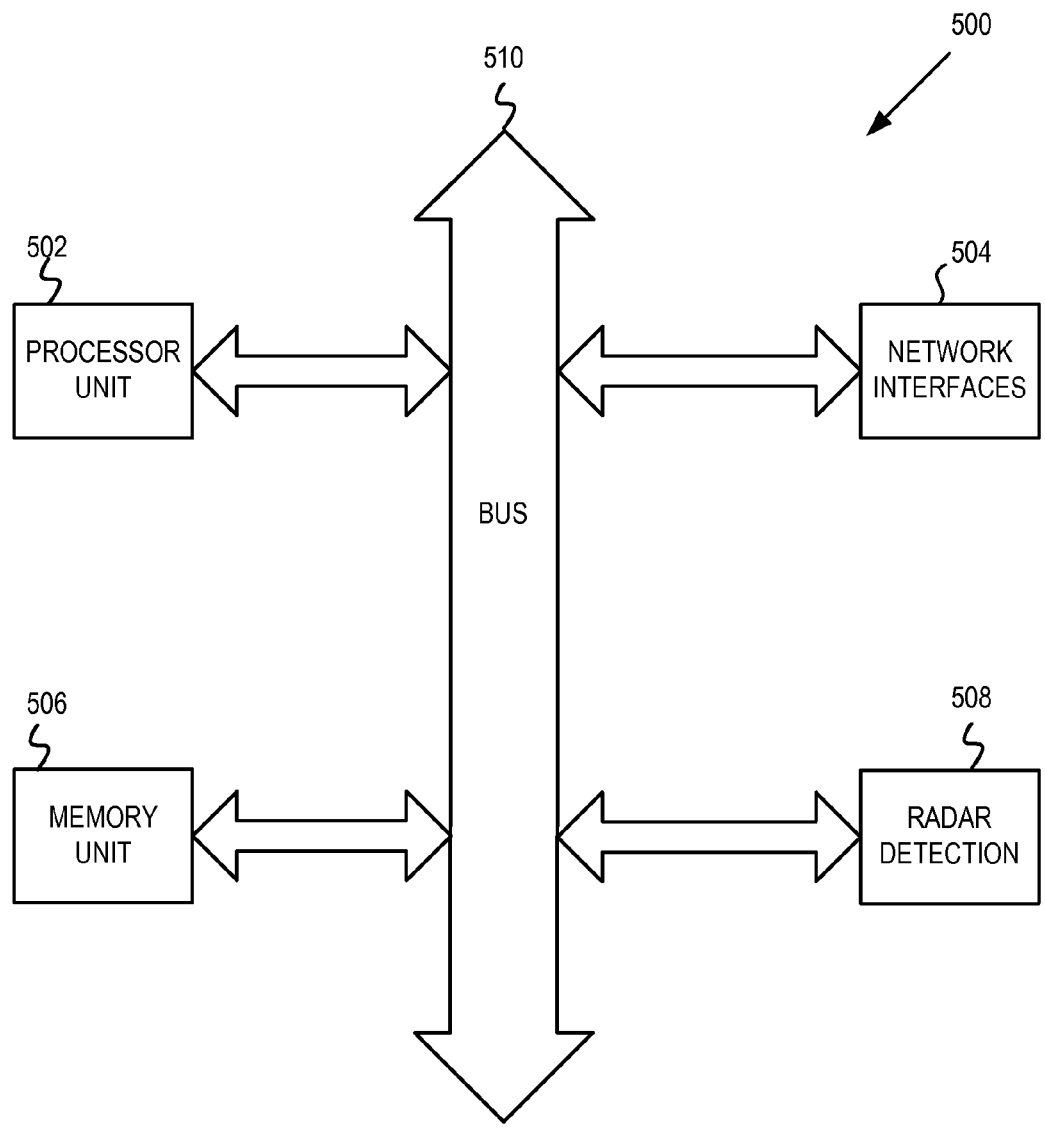
FIG. 5 is a block diagram of an exemplary embodiment of an electronic device including a radar detection module in a wireless receiver.

FIG. 5 is a block diagram of an exemplary embodiment of an electronic device 500 including a radar detection module 508. In some implementations, the electronic device 500 may be one of a laptop computer, a tablet computer, a mobile phone, a powerline communication device, a smart appliance (PDA), access point, or other electronic systems. The electronic device 500 can include processor unit 502 (possibly including multiple processors, multiple cores, multiple nodes, and/or implementing multi-threading, etc.). The electronic device 500 can also include memory unit 506. Memory unit 506 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. Electronic device 500 can also include bus 510 (e.g., PCI, ISA, PCI-Express, HyperTransport®, Infini-Band®, NuBus, AHB, AXI, etc.), and network interfaces 504 that include at least one of a wireless network interface (e.g., a WLAN interface, a Bluetooth® interface, a WiMAX interface, a ZigBee® interface, a Wireless USB (universal serial bus) interface, LTE, CDMA2000 etc.) and a wired network interface (e.g., an Ethernet interface, a powerline communication interface, etc.). In some implementations, electronic device 500 may support multiple network interfaces—each of which is configured to couple the electronic device 500 to a different communication network.

The radar detection module 508 can include elements and modules described in conjunction with wireless receiver 100, and/or the radar detection module 105. The memory unit 506 can embody functionality to implement embodiments described in FIGS. 1-4 above. In one embodiment, memory unit 506 can include one or more functionalities that facilitate detecting radar signals in accordance with received signal pulses. Any one of these functionalities described herein may be partially (or entirely) implemented in hardware and/or on the processor unit 502. For example, the functionality may be implemented with an application specific integrated circuit, in logic implemented in the processor unit 502, in a co-processor on a peripheral device or card, etc. Further, realizations may include fewer or additional components not illustrated in FIG. 5 (e.g., video cards, audio cards, additional network interfaces, peripheral devices, etc.). Processor unit 502, memory unit 506, network interfaces 504 and the radar detection module 508 are coupled to bus 510. Although illustrated as being coupled to the bus 510, memory unit 506 may be coupled to processor unit 502.

While the embodiments are described with reference to various implementations and exploitations, it will be understood that these embodiments are illustrative and that the scope of the inventive subject matter is not limited to them. In general, techniques for radar detection as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for detecting presence of a known radar signal, the method comprising:
   receiving, at a wireless receiver, a first signal pulse and a second signal pulse;
   determining a first signal pulse attribute for the first signal pulse and a second signal pulse attribute for the second signal pulse;
   determining a first Fast Fourier Transform (FFT) representation for the first signal pulse;
   determining a second FFT representation for the second signal pulse;
   determining a frequency variance between the first FFT representation and the second FFT representation;
   modifying a radar signal matching attribute associated with the known radar signal based, at least in part, on the frequency variance; and
   determining that the first signal pulse and the second signal pulse are part of the known radar signal in response to a determination that the first signal pulse attribute and the second signal pulse attribute match the modified radar signal matching attribute.

2. The method of claim 1, further comprising maintaining a pulse count of received signal pulses including at least the first signal pulse and the second signal pulse.

3. The method of claim 2, wherein modifying the radar signal matching attribute is further based the pulse count.

4. The method of claim 2,
   wherein modifying the radar signal matching attribute is in response to the pulse count being greater than or equal to a pulse count threshold associated with the known radar signal.

5. The method of claim 4, wherein the pulse count threshold is based, at least in part, on a minimum number of pulses used to match the known radar signal in a regulatory domain.

6. The method of claim 1,
   wherein the radar signal matching attribute comprises a pulse repetition interval (PRI) multiplier attribute, and
   wherein modifying the known radar signal matching attribute comprises increasing the PRI multiplier attribute in response to the frequency variance being less than or equal to a frequency variance threshold.

7. The method of claim 1, wherein the frequency variance between the first FFT representation and the second FFT representation is based, at least in part, on a difference between a first frequency value of the first FFT representation and a second frequency value of the second FFT representation.

8. The method of claim 1, wherein determining the frequency variance comprises:
   determining a maximum frequency value of the first FFT representation and the second FFT representation;
   determining a minimum frequency value of the first FFT representation and the second FFT representation; and
   determining the frequency variance based, at least in part, on a difference between the maximum frequency value and the minimum frequency value.

9. The method of claim 1, wherein modifying the radar signal matching attribute comprises:
   relaxing a criteria for detecting the known radar signal in response to a determination that the frequency variance is less than or equal to a frequency variance threshold.

10. The method of claim 9, further comprising:
    determining the frequency variance threshold based, at least in part, on one bin of the first FFT representation.

11. The method of claim 1,
    wherein the radar signal matching attribute comprises a pulse count matching attribute, and
    wherein modifying the known radar signal matching attribute comprises reducing the pulse count matching attribute in response to the frequency variance being less than or equal to a frequency variance threshold.

12. The method of claim 1, wherein the known radar signal matching attribute is a pulse width, a pulse count, a pulse repetition interval (PRI), a PRI multiplier, or a combination thereof.

13. The method of claim 1, wherein the radar signal matching attribute is one of a plurality of radar signal matching attributes, and wherein
    determining that the first signal pulse and the second signal pulse are part of the known radar signal comprises:
    matching a plurality of signal pulse attributes for the first signal pulse and the second signal pulse to corresponding attributes of the plurality of radar signal matching attributes.

14. A wireless device comprising:
    a wireless receiver configured to:
    receive a first signal pulse and a second signal pulse, and
    determine a first signal pulse attribute for the first signal pulse and a second signal pulse attribute for the second signal pulse;

a Fast Fourier Transform (FFT) module configured to determine a first FFT representation for the first signal pulse and a second FFT representation for the second signal pulse;

an FFT analysis module configured to determine a frequency variance between the first FFT representation and the second FFT representation; and, a pattern matching module configured to:
modify a radar signal matching attribute associated with a known radar signal based, at least in part, on the frequency variance, and
determine that the first signal pulse and the second signal pulse are part of the known radar signal in response to a determination that the first signal pulse attribute and the second signal pulse attribute match the modified radar signal matching attribute.

15. The wireless device of claim 14, further comprising a pulse counter configured to maintain a pulse count of received signal pulses including at least the first signal pulse and the second signal pulse.

16. The wireless device of claim 15, wherein the pattern matching module is further configured to modify the radar signal matching attribute based, at least in part, on the pulse count.

17. The wireless device of claim 15, wherein the pattern matching module is configured to
determine a pulse count threshold associated with the known radar signal, and
modify the radar signal matching attribute in response to the pulse count being greater than or equal to the pulse count threshold.

18. The wireless device of claim 17, wherein the pulse count threshold is based, at least in part, on a minimum number of pulses used to match the known radar signal in a regulatory domain.

19. The wireless device of claim 14,
wherein the radar signal matching attribute comprises a pulse repetition interval (PRI) multiplier attribute, and
wherein the pattern matching module is configured to determine the radar signal matching attribute by increasing the PRI multiplier attribute in response to the frequency variance being less than or equal to a frequency variance threshold.

20. The wireless device of claim 14, wherein the FFT analysis module is configured to determine the frequency variance based, at least in part, on a difference between a first frequency value of the first FFT representation and a second frequency value of the second FFT representation.

21. The wireless device of claim 14, wherein the FFT analysis module is configured to:
determine a maximum frequency value of the first FFT representation and the second FFT representation;
determine a minimum frequency value of the first FFT representation and the second FFT representation; and
determine the frequency variance based, at least in part, on a difference between the maximum frequency value and the minimum frequency value.

22. The wireless device of claim 14, wherein the pattern matching module is further configured to:
relax a criteria for detecting the known radar signal in response to a determination that the frequency variance is less than or equal to a frequency variance threshold.

23. The wireless device of claim 16,
wherein the radar signal matching attribute comprises a pulse count matching attribute, and
wherein the pattern matching module is configured to modify the radar signal matching attribute by reducing the pulse count matching attribute in response to the frequency variance being less than or equal to a frequency variance threshold.

24. A non-transitory machine-readable storage medium having instructions stored therein, which when executed by one or more processors causes the one or more processors to perform operations that comprise:
receiving, at a wireless receiver, a first signal pulse and a second signal pulse;
determining a first signal pulse attribute for the first signal pulse and a second signal pulse attribute for the second signal pulse;
determining a first Fast Fourier Transform (FFT) representation for the first signal pulse;
determining a second FFT representation for the second signal pulse;
determining a frequency variance between the first FFT representation and the second FFT representation;
modifying a radar signal matching attribute associated with a known radar signal based, at least in part, on the frequency variance; and
determining that the first signal pulse and the second signal pulse are part of the known radar signal in response to a determination that the first signal pulse attribute and the second signal pulse attribute match the modified radar signal matching attribute.

25. The non-transitory machine readable storage medium of claim 24, wherein the operations further comprise maintaining a pulse count of received signal pulses including at least the first signal pulse and the second signal pulse.

26. The non-transitory machine readable storage medium of claim 25, wherein the operation of modifying the radar signal matching attribute is further based, at least in part, on the pulse count.

27. The non-transitory machine readable storage medium of claim 25, wherein the operations further comprise:
determining a pulse count threshold associated with the known radar signal,
wherein modifying the radar signal matching attribute is in response to the pulse count being greater than or equal to the pulse count threshold.

28. The non-transitory machine readable storage medium claim 27, wherein the pulse count threshold is based, at least in part, on a minimum number of pulses used to match the known radar signal in a regulatory domain.

29. The non-transitory machine readable storage medium of claim 24,
wherein the radar signal matching attribute comprises a pulse repetition interval (PRI) multiplier attribute, and
wherein modifying the radar signal matching attribute comprises increasing the PRI multiplier attribute in response to the frequency variance being less than or equal to a frequency variance threshold.

30. The non-transitory machine readable storage medium of claim 24, wherein the operations for determining the frequency variance between the first FFT representation and the second FFT representation is based, at least in part, on a difference between a first frequency value of the first FFT representation and a second frequency value of the second FFT representation.

31. The non-transitory machine readable storage medium of claim 24, wherein the operations further comprise:
determining a maximum frequency value of the first FFT representation and the second FFT representation;
determining a minimum frequency value of the first FFT representation and the second FFT representation; and determining the frequency variance based, at least in part, on a difference between the maximum frequency value and the minimum frequency value.

32. The non-transitory machine readable storage medium of claim 24, wherein the operations further comprise relaxing a criteria for detecting the known radar signal in response to a determination that the frequency variance is less than or equal to a frequency variance threshold.

33. The non-transitory machine readable storage medium of claim 26, wherein the radar signal matching attribute comprises a pulse count matching attribute, and wherein the operation of modifying the radar signal matching attribute comprises reducing the pulse count matching attribute in response to the frequency variance being less than or equal to a frequency variance threshold.

\* \* \* \* \*